Oct. 30, 1928.
J. VOLESKE
SHEARS
Filed Feb. 15, 1926
1,689,648
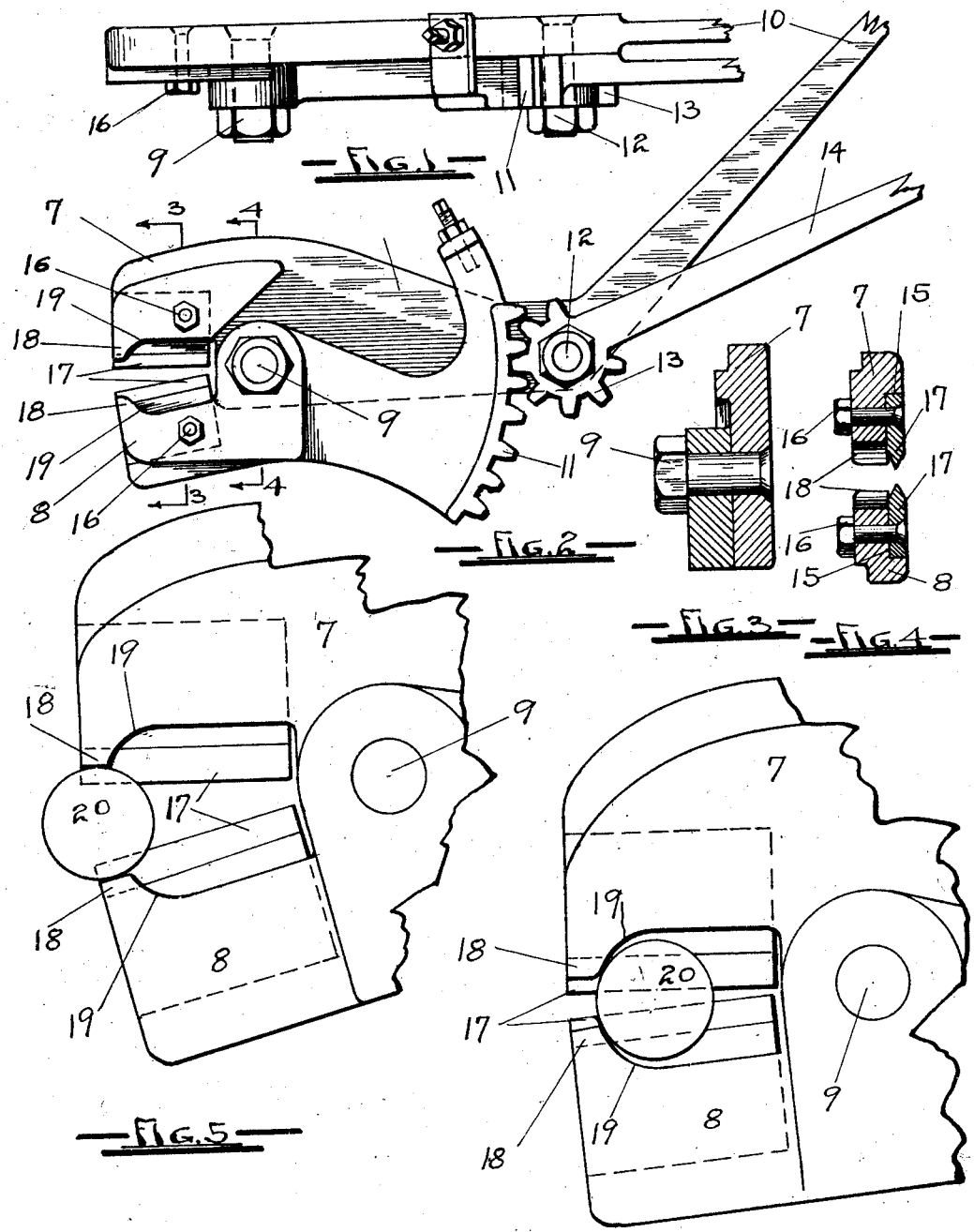
INVENTOR
JOHN VOLESKE
BY C. F. Blake
ATTORNEY Patented Oct. 30, 1928.

1,689,648

UNITED STATES PATENT OFFICE.

JOHN VOLESKE, OF PORTLAND, OREGON.

SHEARS.

Application filed February 15, 1926. Serial No. 88,462.

My invention relates to shears in general, and particularly to shears for cutting metal bars, the object being to provide guards for the cutting knives to prevent them from injury by cutting too deep at their extreme ends and to crowd the bar back towards the pivotal point of the shears; a further object being to provide a flat face upon one side of the knives to admit of close cutting against walls or other objects.

I accomplish the above objects by means of the construction illustrated in the accompanying drawing, which is a part of this application for Letters Patent, like characters of reference indicating like parts throughout the several views thereof, and in which:

Fig. 1 is a plan view of my device.
Fig. 2 is a side elevation of the same.
Fig. 3 is a section upon line 3—3 of Fig. 2.
Fig. 4 is a section upon line 4—4 of Fig. 2.
Fig. 5 is a diagrammatic fragmentary elevation upon an enlarged scale illustrating the action of the guards to protect the extreme ends of the knives.
Fig. 6 is a diagrammatic fragmentary elevation upon an enlarged scale illustrating the action of the guards in crowding a bar backwards between the knives.

My device consists of two jaws 7 and 8 pivoted together by a bolt 9. The jaw 7 is extended rearward and formed into a handle 10, and the jaw 8 is also extended rearward and upon the rear end thereof is provided a gear segment 11.

Pivoted at 12 upon the jaw 7 is a pinion segment 13 meshing with the gear segment 11, and said pinion segment 13 is provided with a handle 14. The two handles 10 and 14 are thus brought together to close the jaws 7 and 8.

The jaws 7 and 8 are recessed to receive knives as shown at 15 in Fig., 4, thus the knives and their respective jaws form a smooth surface or face on the outer face of my device, allowing the knives to be placed close up to a wall or other object when cutting a bar if desired. Each knife is secured in place within its recess by a bolt 16. All bolts are countersunk upon the smooth side of the device.

Upon the inner side of the knives 17 their respective jaws are projected towards each other to form a guard 18 and these guards are rounded off towards the jaws with large radius fillets 19.

If a bar 20 to be cut is placed between the knives 17 at their extreme ends, said guards 18 will contact with the bar before the knives have been strained or damaged by being forced too far into the bar. This action is illustrated in Fig. 5.

But if such a bar be placed just behind said guards the guards will crowd the bar back towards the pivot of the shears to a point where the knives are stronger than at their extreme ends, and thus protect the knives from over strain or damage.

My device may be made of any size, and constructed of any materials deemed convenient and suitable for a device of this character, and while I have illustrated and described a form of construction found desirable in materializing my invention, I wish to include in this application all mechanical equivalents and substitutes that may fairly be considered to come within the scope and purview of my invention as defined in the appended claims.

Having disclosed my invention so that others may be enabled to construct and to use the same, what I claim as new, and desire to secure by Letters Patent is:

1. In a shear: pivotally mounted jaws; knives mounted upon said jaws; guards projecting from said jaws at the extreme ends of said knives, and filleted upon said jaws towards the pivotal point thereof.

2. In a shear: a pair of jaws; knives upon said jaws; guards upon said jaws positioned to prevent the extreme ends of said knives from cutting too deep; and fillets joining said guards to said jaws positioned to force material away from the extreme ends of said knives.

In witness whereof I claim the foregoing as my own I hereunto affix my signature at Portland, county of Multnomah, State of Oregon this 25th day of Aug. 1925.

JOHN VOLESKE.